US010308125B2

(12) United States Patent
Ahrens

(10) Patent No.: US 10,308,125 B2
(45) Date of Patent: Jun. 4, 2019

(54) METHOD AND SYSTEM FOR POWER EXCHANGE

(71) Applicant: ATMO Auto Power LLC, South San Francisco, CA (US)

(72) Inventor: Jason Ahrens, San Francisco, CA (US)

(73) Assignee: ATMO AUTO POWER LLC, Galt, CA (US)

(*) Notice: Subject to any disclaimer, the term of this patent is extended or adjusted under 35 U.S.C. 154(b) by 0 days.

(21) Appl. No.: 15/566,553

(22) PCT Filed: Apr. 22, 2016

(86) PCT No.: PCT/US2016/029011
§ 371 (c)(1),
(2) Date: Oct. 13, 2017

(87) PCT Pub. No.: WO2016/172605
PCT Pub. Date: Oct. 27, 2016

(65) Prior Publication Data
US 2018/0118044 A1    May 3, 2018

Related U.S. Application Data

(60) Provisional application No. 62/166,339, filed on May 26, 2015, provisional application No. 62/150,937, filed on Apr. 22, 2015.

(51) Int. Cl.
*B60K 1/04* (2019.01)
*B60L 11/18* (2006.01)
(Continued)

(52) U.S. Cl.
CPC ............ *B60L 11/1822* (2013.01); *B60K 1/04* (2013.01); *B60L 53/60* (2019.02); *B60L 53/65* (2019.02);
(Continued)

(58) Field of Classification Search
CPC ....................................................... B60S 5/06
See application file for complete search history.

(56) References Cited

U.S. PATENT DOCUMENTS 3,799,063 A    3/1974 Reed
4,102,273 A    7/1978 Merkle et al.
(Continued)

FOREIGN PATENT DOCUMENTS

CN    102139680    8/2011
CN    201970973    9/2011
(Continued)

OTHER PUBLICATIONS

International Search Report for PCT/US2016/029011, dated Sep. 21, 2016.
(Continued)

*Primary Examiner* — Erez Gurari
(74) *Attorney, Agent, or Firm* — Stephen J. Weyer, Esq.; Stites & Harbison, PLLC

(57) ABSTRACT

A system and method for vehicle power exchange includes both a system for exchanging a container having a power cell associated with the vehicle and an appropriate vehicle which has been adapted for vehicle power exchange. Advantageously, the system includes at least one power exchange power strip, at least one container with charged power cell associated with the power strip and wireless communication associated with the power exchange strip for communicating with a vehicle to effect power exchange. An advantageous vehicle for power exchange has a removable container with power cell, a computer processor for controlling requisite functions of the vehicle during power exchange (i.e. container exchange) and a mechanism which allows for the
(Continued)

depositing of a container with depleted power cell and insertion of a replacement container with charged power cell into the vehicle.

14 Claims, 14 Drawing Sheets

(51) Int. Cl.
  *B60S 5/06* (2019.01)
  *B60L 53/80* (2019.01)
  *B60L 53/60* (2019.01)
  *B60L 53/65* (2019.01)

(52) U.S. Cl.
  CPC .............. *B60L 53/80* (2019.02); *B60S 5/06* (2013.01); *B60K 2001/0438* (2013.01); *B60K 2001/0472* (2013.01); *Y02T 10/7005* (2013.01); *Y02T 10/7072* (2013.01); *Y02T 90/121* (2013.01); *Y02T 90/124* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 5,305,513 A | 4/1994 | Lucid et al. |
| 5,598,083 A | 1/1997 | Gaskins |
| 5,612,606 A | 3/1997 | Guimarin et al. |
| 5,711,648 A | 1/1998 | Hammerslag |
| 5,951,229 A | 9/1999 | Hammerslag |
| 5,998,963 A | 12/1999 | Aareth |
| 6,014,597 A | 1/2000 | Kochanneck |
| 6,066,928 A | 5/2000 | Kinoshita et al. |
| 6,094,028 A | 7/2000 | Gu et al. |
| 6,113,342 A | 9/2000 | Smith et al. |
| 7,770,673 B2 | 8/2010 | Allen et al. |
| 8,013,571 B2 | 9/2011 | Agassi |
| 8,146,694 B2 | 4/2012 | Hamidi |
| 8,164,300 B2 | 4/2012 | Agassi |
| 8,164,302 B2 | 4/2012 | Capizzo |
| 8,288,989 B2 | 10/2012 | Baba |
| 8,694,155 B2 | 4/2014 | Yu |
| 8,825,202 B2 | 9/2014 | Yu |
| 8,858,152 B1 | 10/2014 | McDaniel |
| 8,862,391 B2 | 10/2014 | Park et al. |
| 8,868,235 B2 | 10/2014 | Zhao et al. |
| 8,869,384 B2 | 10/2014 | Park et al. |
| 8,875,826 B2 | 11/2014 | Franzen et al. |
| 8,963,495 B2 | 2/2015 | Park et al. |
| 8,970,341 B2 | 3/2015 | Park et al. |
| 8,973,254 B2 * | 3/2015 | Droste ............... B60L 11/1877 29/730 |
| 9,026,357 B2 | 5/2015 | Park et al. |
| 9,352,728 B2 | 5/2016 | Corfitsen |
| 2008/0294283 A1 | 11/2008 | Ligrano |
| 2009/0102434 A1 | 4/2009 | Nakajima et al. |
| 2009/0198372 A1 | 8/2009 | Hammerslag |
| 2010/0071979 A1 * | 3/2010 | Heichal ............... B60K 1/04 180/68.5 |
| 2010/0112843 A1 * | 5/2010 | Heichal ............... B60K 1/04 439/299 |
| 2011/0025268 A1 | 2/2011 | Davidovitch |
| 2011/0223459 A1 * | 9/2011 | Heichal ............... B60K 1/04 429/100 |
| 2013/0041531 A1 | 2/2013 | Lafrance |
| 2013/0206360 A1 | 8/2013 | Zhang et al. |
| 2014/0002019 A1 | 1/2014 | Park et al. |
| 2014/0248108 A1 | 9/2014 | Bachir et al. |
| 2015/0013130 A1 | 1/2015 | Buffet |
| 2015/0042157 A1 | 2/2015 | Chen et al. |
| 2015/0127479 A1 | 5/2015 | Penilla et al. |
| 2015/0129337 A1 | 5/2015 | Corfitsen |

FOREIGN PATENT DOCUMENTS

| | | |
|---|---|---|
| EP | 2 230 142 | 9/2010 |
| WO | WO-2013144948 | 10/2013 |
| WO | WO-2013158026 | 10/2013 |

OTHER PUBLICATIONS

Written Opinion of the International Searching Authority for PCT/US2016/029011, dated Sep. 21, 2016.
Supplementary Partial European Search Report dated Oct. 25, 2018.
Search Report dated Mar. 14, 2019 in corresponding European Patent Application No. 16784011.5.

* cited by examiner

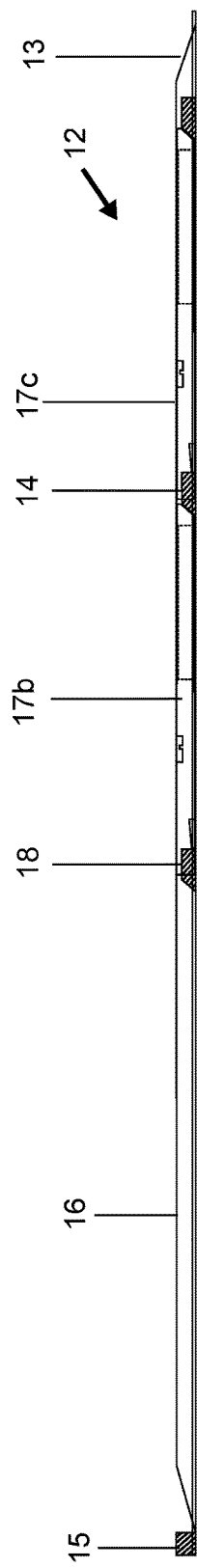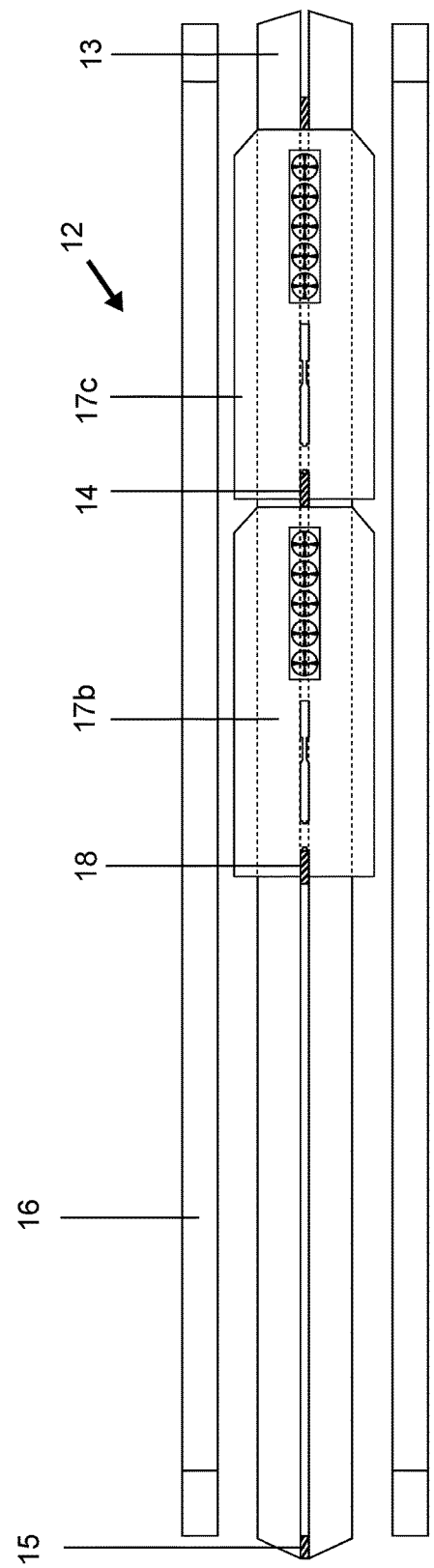

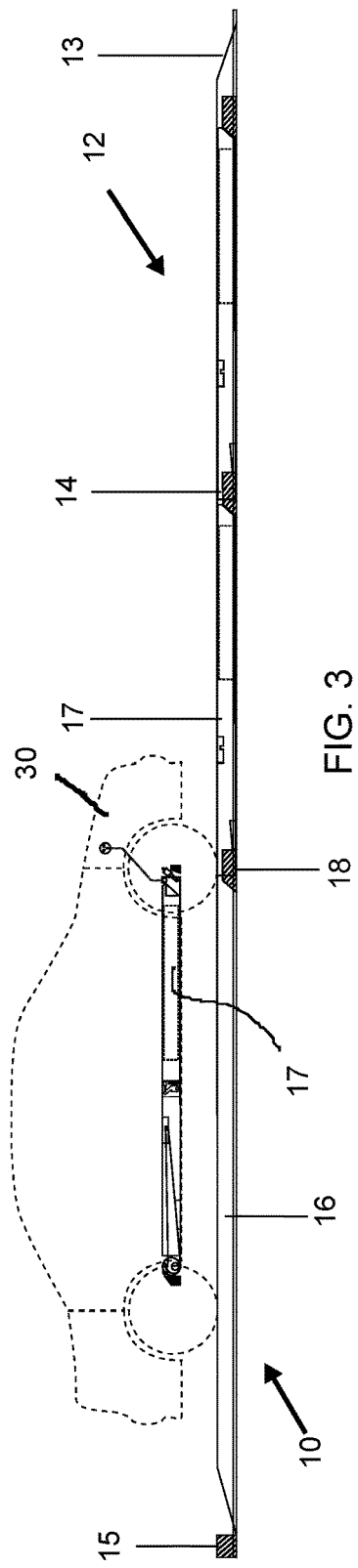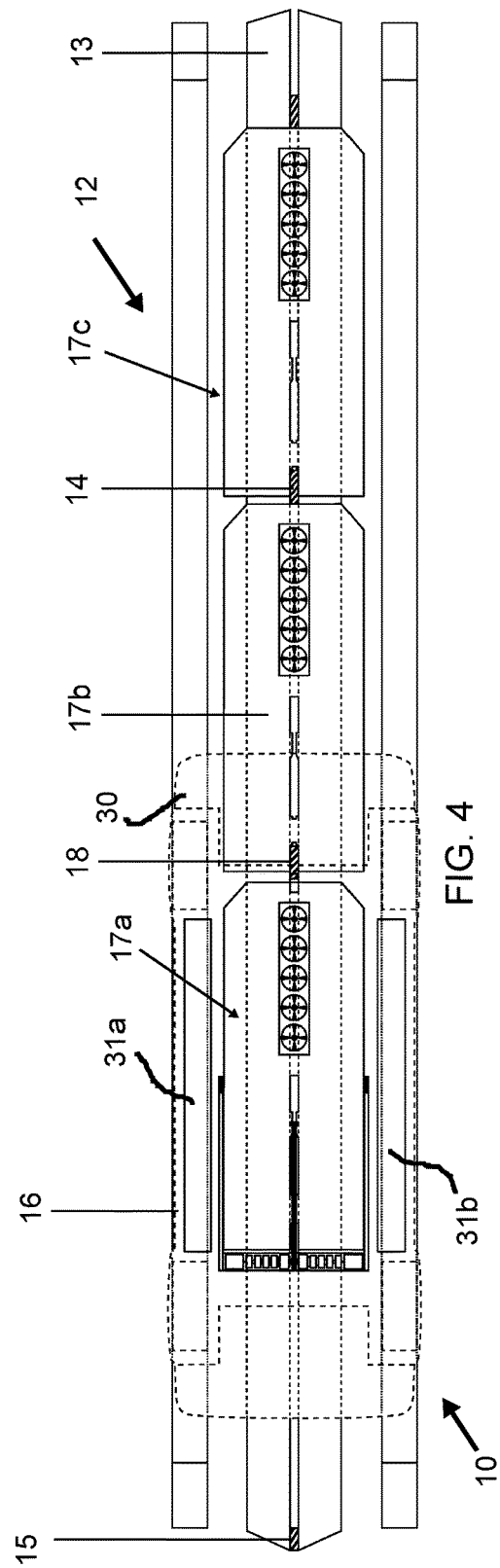

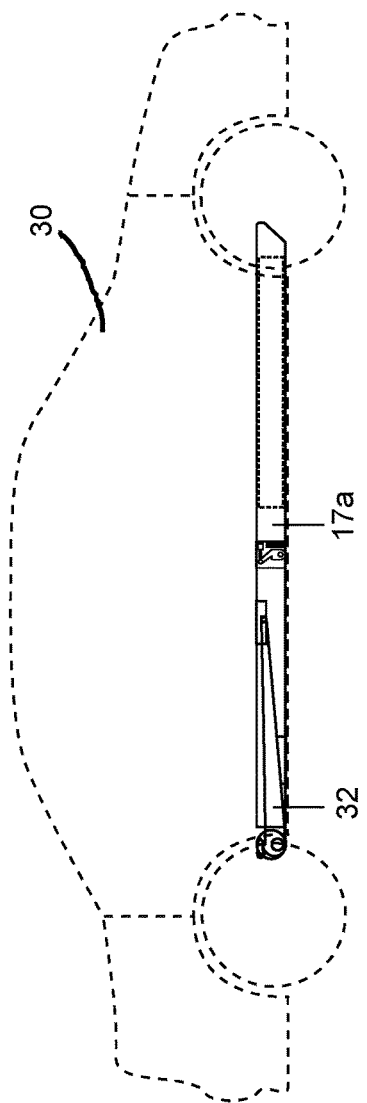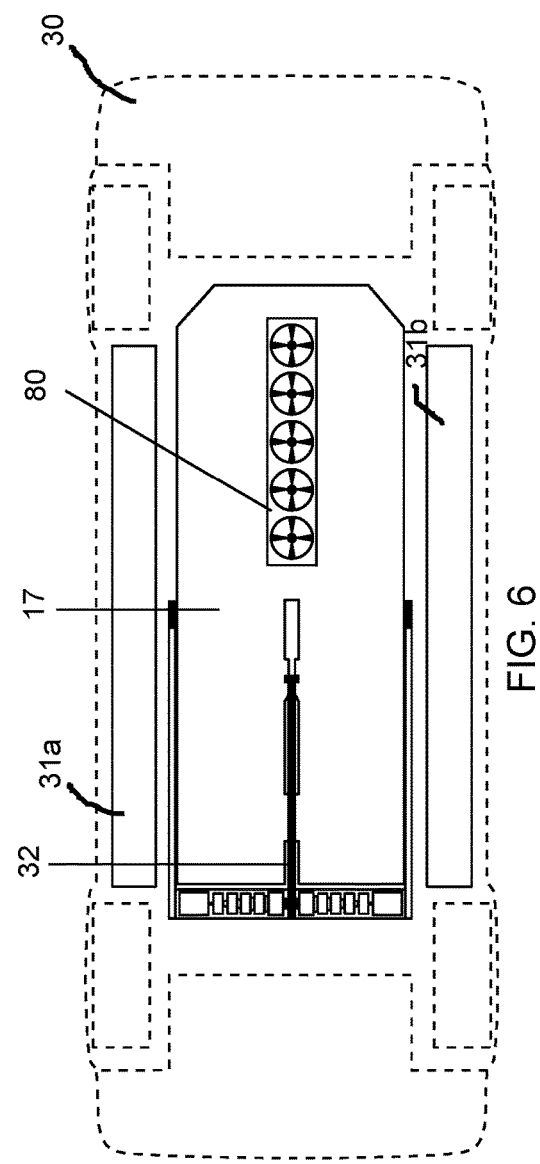

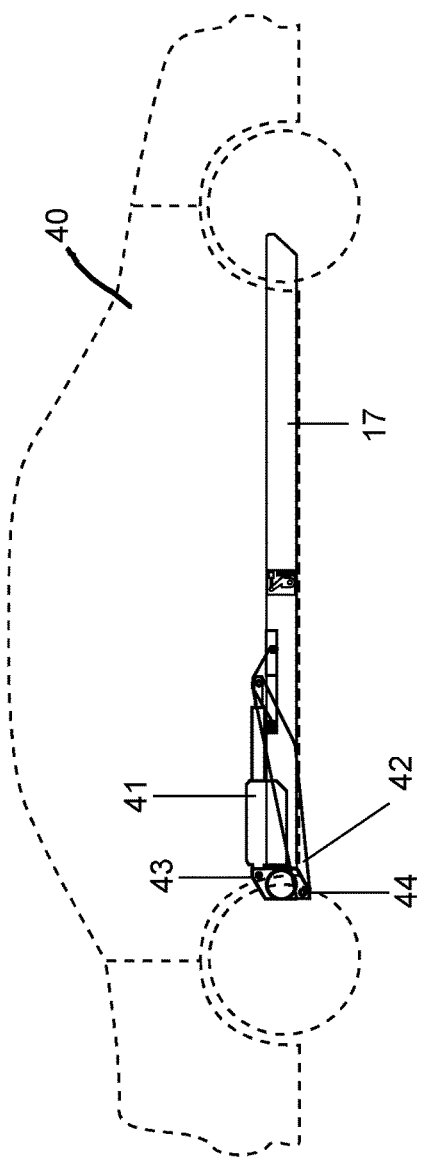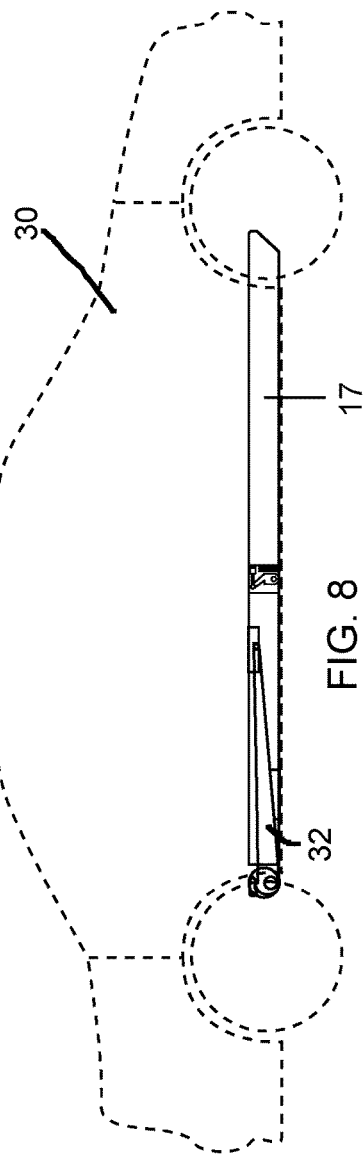

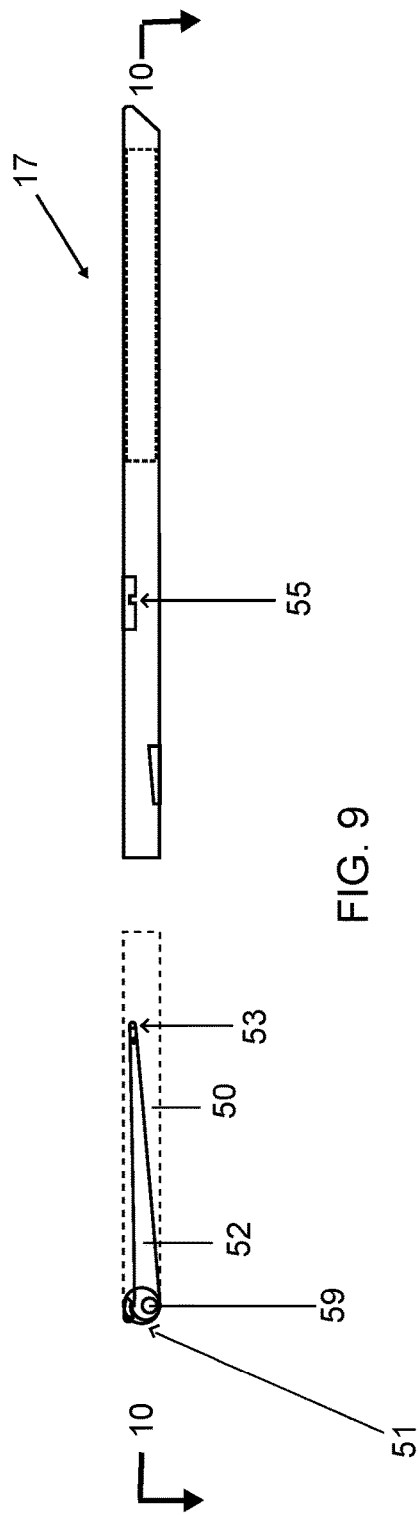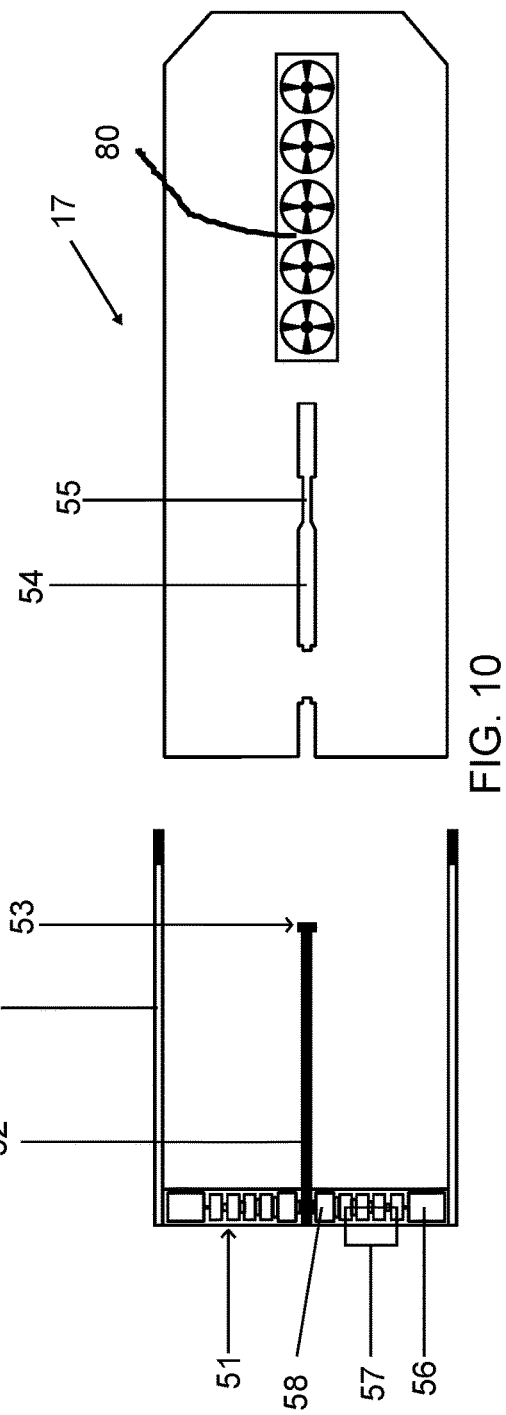

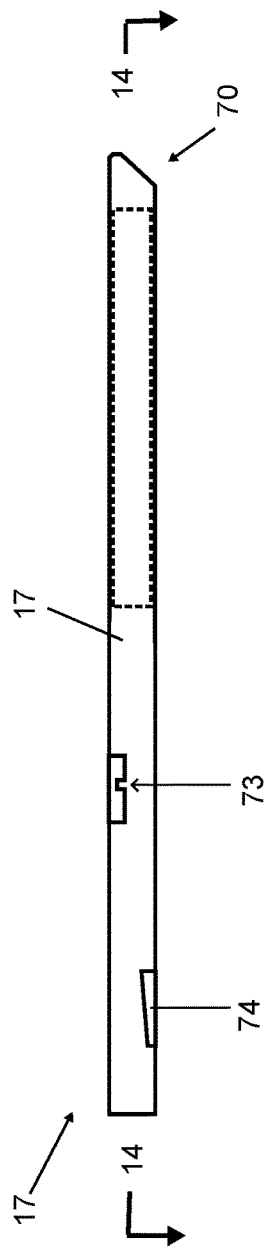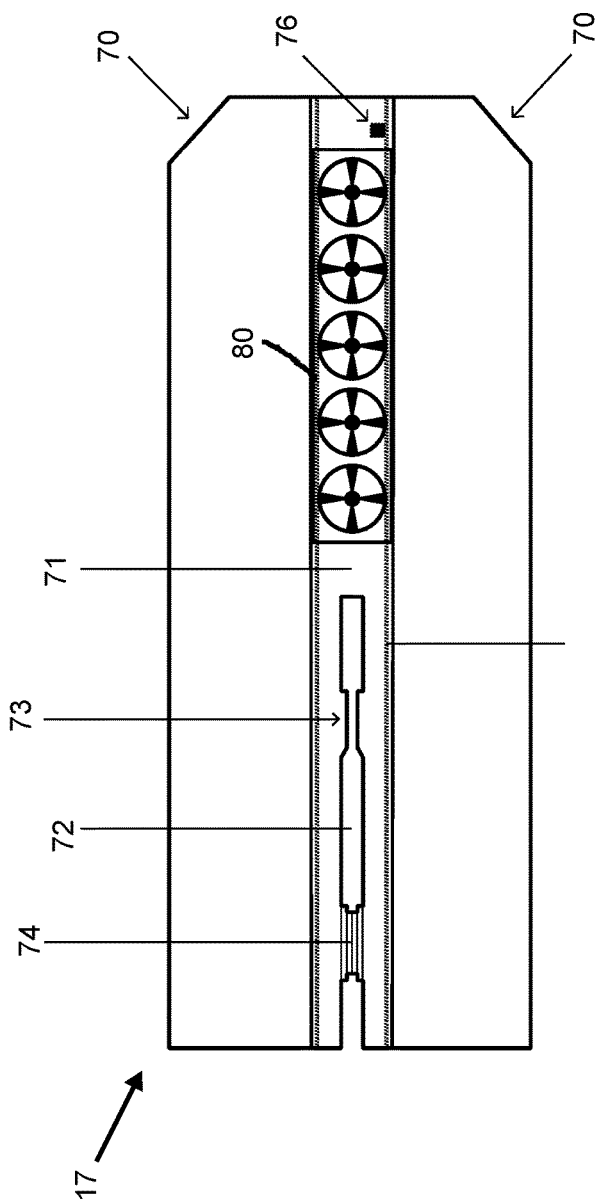

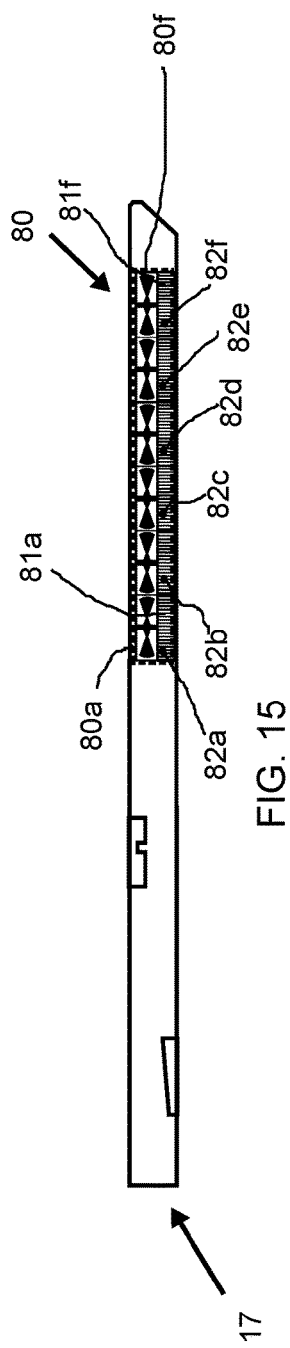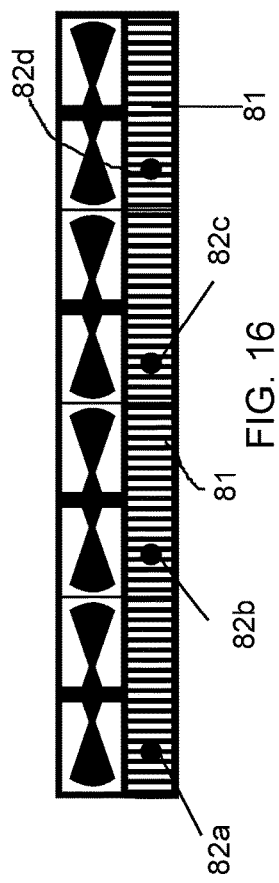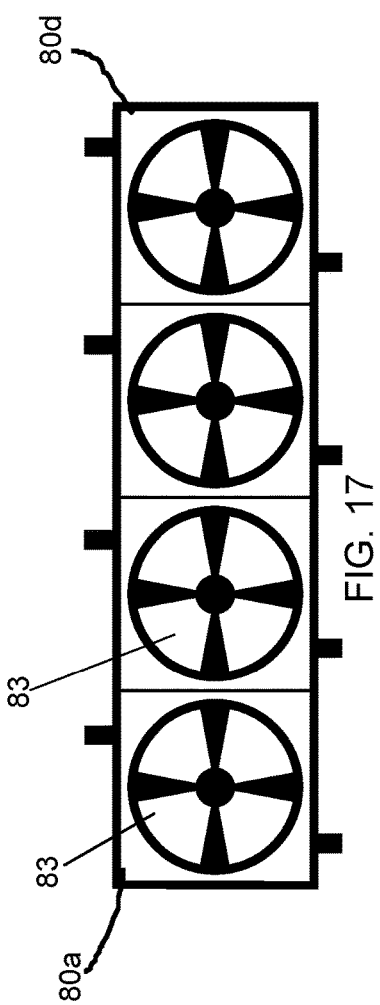

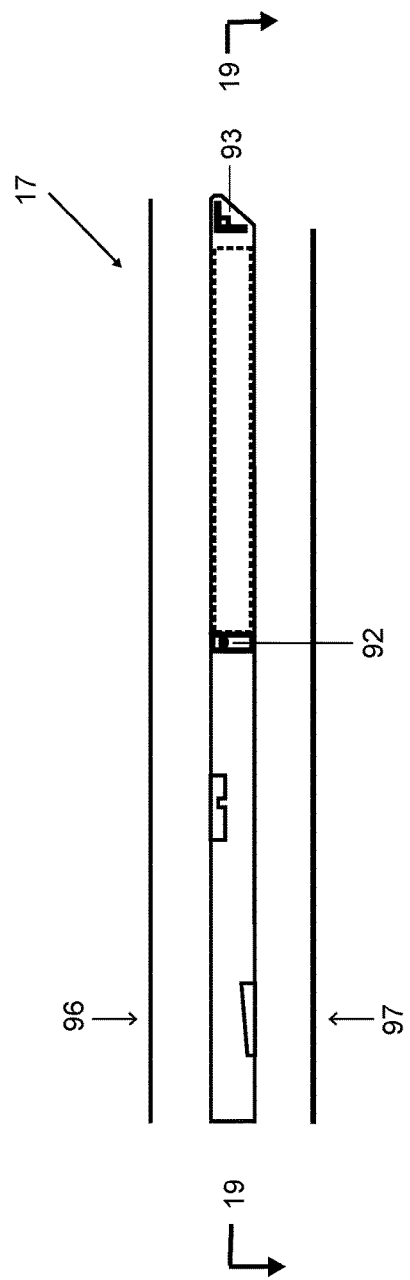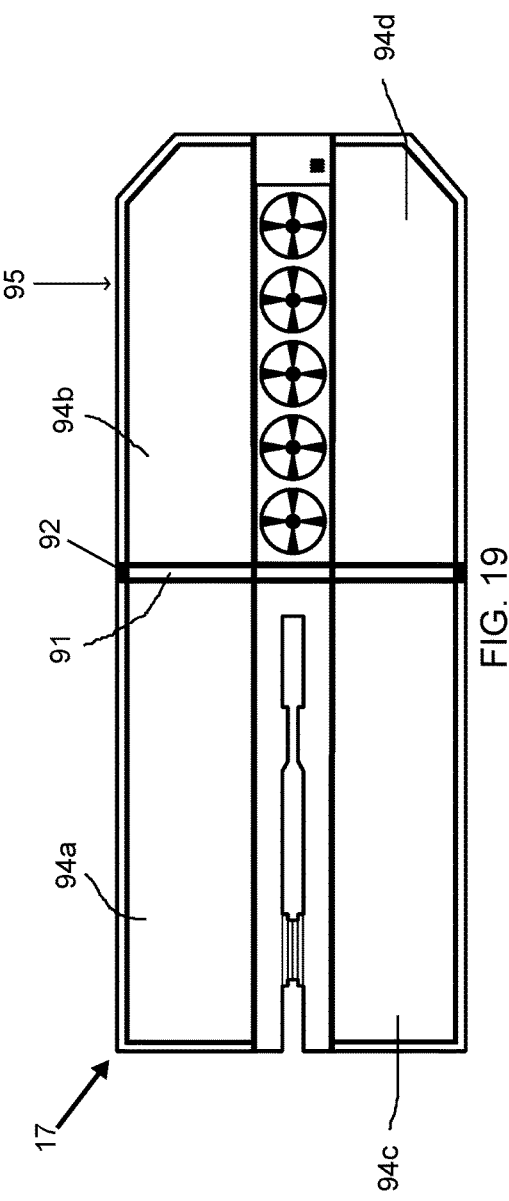

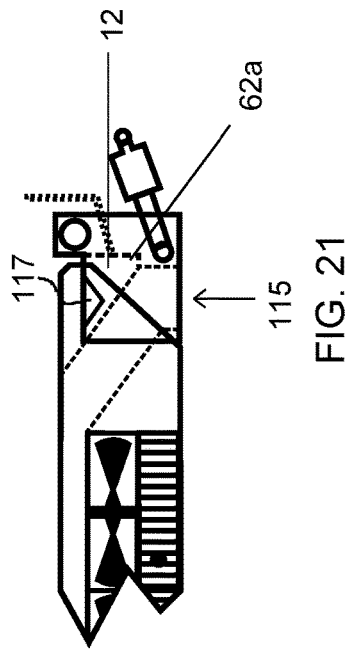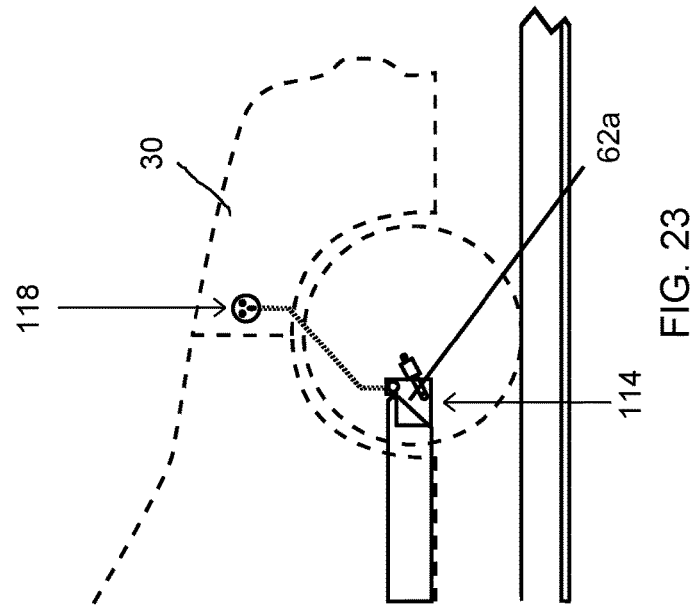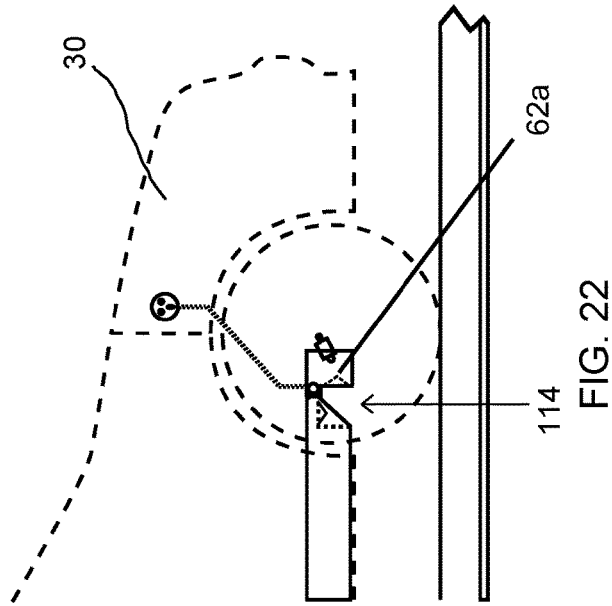

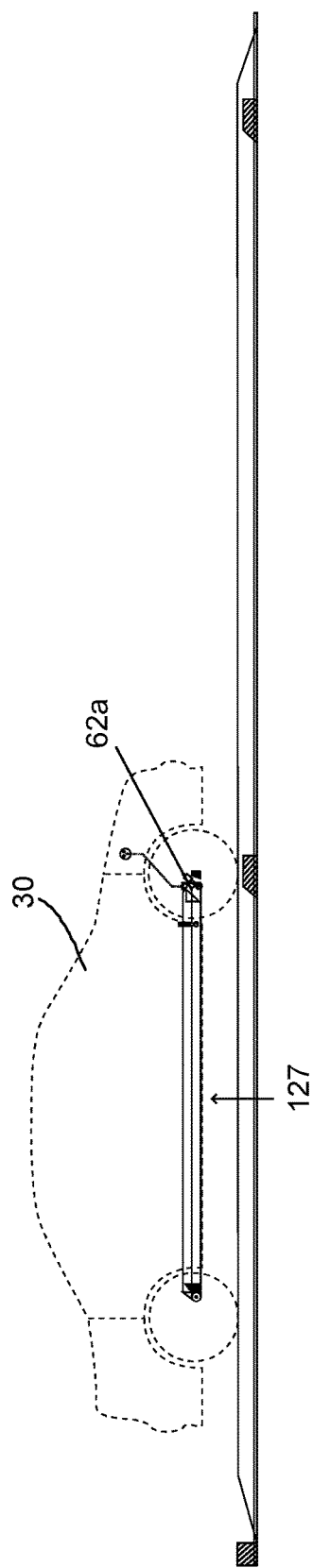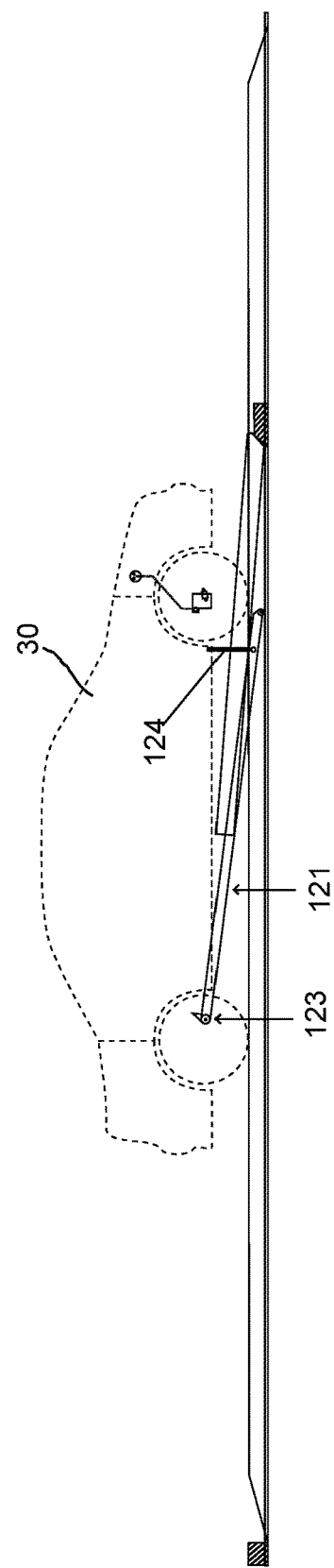

METHOD AND SYSTEM FOR POWER EXCHANGE

CROSS REFERENCE TO RELATED APPLICATIONS

This application claims benefit of U.S. Provisional Application No. 62/150,937, filed Apr. 22, 2015 and U.S. Provisional Patent Application No. 62/166,339, filed May 26, 2015, both herein incorporated by reference.

FIELD OF INVENTION

The present invention relates to a method and system for exchanging a power source which includes but is not limited to replacing, i.e. exchanging, one power supply such as a battery for another. Advantageously, this includes the exchange of the power source of an electric vehicle.

BACKGROUND OF THE INVENTION

Alternative fuel vehicles are becoming increasingly popular. Such vehicles use alternative fuel sources than conventional petroleum such as gasoline and diesel. Some alternative fuel sources include but are not limited to natural gas, battery/chemical-electrical source, fuel cell, etc. As with conventional vehicles, one must replenish the fuel source consumed by the vehicle. This has resulted in the development of various refueling, recharging, regeneration or other means for replenishing the fuel source for the alternative fueled vehicle.

Alternative fuel vehicles which are powered by battery in many instances are recharged by plugging the vehicle into a suitable recharging receptacle which recharges the batteries on-board the vehicle. One recent alternative to this is to replace the battery packs on the vehicle after they have been depleted with fully charged batteries. However, current technologies for accomplishing alternative powered vehicle battery replacements in the field requires significant infrastructure in terms of a facility to accommodate the vehicle during a battery exchange and the mechanism necessary to accomplish a replacement of a series of depleted batteries with replacement ones that are charged. Accordingly, such systems are not economically feasible and/or developed at a stage which allow for real-time battery replacement as a means of replenishing an alternative powered vehicle every time its battery is depleted.

SUMMARY OF THE INVENTION

The present technology, hereafter known as Autonomous Linear Exchange (ALE) includes a unique method and system for removing, receiving, charging, deploying, and replacing a vehicle's main power source, include a power source disposed in container, in which the container includes a power source such as a battery bank, fuel cell, or other stored power device, of an Auxiliary Powered Exchange equipped vehicle. This includes devices which operate by electricity, e.g. using a battery as well as those which utilize a fuel cell. More specifically this technology can be used to exchange the main drive batteries of an electric powered vehicle which are disposed in a container or other replaceable unit. However, this technology can be adapted for use for exchanging any power source including various types of power sources which are used by vehicles including electric vehicles. The present invention pertains to both stationary equipment designed to receive, charge, organize, and deploy said power sources, batteries or fuel cells with extreme efficiency and simplicity, as well as componentry and a specialized modular container intended for incorporation into automotive designs which enable the vehicle to interact with the stationary equipment.

In one advantageous form, a suitable vehicle has a battery bank, battery pack, power pack, cell(s), including fuel cells, etc., (collectively generically referred to as a "power cell" which may include one or more cells or discrete power units) self-contained in what is referred to in this disclosure as a "container". This container also includes, in an advantageous embodiment, an oil cooler and the container may also include other elements which allow the container to be a self-contained, removable power source, which provide main power to the vehicle. It is this container which is exchanged when depleted of power using the present system.

Further, in addition to the container which is the main power source for the vehicle, the vehicle will advantageously also have auxiliary power which assists during the container exchange. Preferably, both the power cell (in the container) and the auxiliary power can be recharged (as an option if desired by the manufacturer) by plugging the vehicle into a suitable recharging outlet/source.

In yet another advantageous form, power may be supplied during the lifting of a replacement container into the vehicle using the power in the power cell of the container. Thus the power cell in the replacement container will augment and/or supplant the use of the vehicle's auxiliary power source.

The present invention, in one form thereof, relates to a system for vehicle power exchange. The system has at least one power exchange strip and at least one charged container having a power cell and being associated with the at least one power exchange strip. A wireless communication device is operatively associated with the at least one power exchange strip for communicating between the at least one power exchange strip and a vehicle requesting power exchange. A processor is associated with the at least one power exchange strip and the wireless communication device for controlling functions of the vehicle requesting power exchange.

In one further form, the at least one power exchange strip has a first station for receiving a depleted container with power cell from a vehicle requesting power exchange and a second station has a replacement container with charged power cell for installation of the container into the vehicle after the depleted container has been removed. In one further advantageous form, the processor controls movement of the vehicle between the first station and the second station.

In an alternative further form, the vehicle has auxiliary power in addition to the power in the container's power cell to be replaced, which auxiliary power, powers movement of the vehicle from the first station to the second station, after the depleted power pack has been removed from the vehicle.

In alternative forms, depending on the vehicle, the power cell is a chemical battery pack or a fuel cell pack.

The present invention, in another form thereof, relates to an on-board vehicle system for power exchange. The on-board vehicle system has a removable container with a power cell for primarily powering movement of the vehicle. A computer processor is associated with the vehicle for controlling requisite functions of the vehicle during power exchange including releasing a depleted container, movement of the vehicle after the depleted power pack has been removed and insertion of a replacement container with charged power cell into the vehicle. A drop mechanism is associated with the computer processor for releasing a depleted container. A lift mechanism is operatively associated with the computer processor for inserting a replacement container with charged power cell into the vehicle.

In one further form, an auxiliary power source is provided in the vehicle to power the drop mechanism and the lift mechanism. In one further form, the auxiliary power also powers movement of the vehicle from a first charging station after the removable container with depleted power cell has been removed from the vehicle, to a second station where a replacement container with charged power cell is located.

The present invention, in another form thereof, relates to a method for vehicle power exchange. The method includes receiving a vehicle for power exchange at a first position along a power exchange strip and establishing a wireless communication connection between the vehicle and the power exchange strip to control vehicle function during power exchange. The method further includes communicating instructions to a computer processor of the vehicle via the wireless communication connection to release a container with depleted power cell from the vehicle at the first position along the power strip. The vehicle is then moved to a second position along the power exchange strip. Finally, a replacement container with charged power cell is inserted into the vehicle, in which the replacement container is associated at the second position of the power exchange strip. The method in a further form includes moving the vehicle to a second position along the power exchange strip, using auxiliary power on-board the vehicle, supplemental to the power of the removed power cell.

In one further form, communicating instruction to a computer processor of the vehicle via the communication connection releases a depleted container from the vehicle, at the first position along the power exchange strip resulting in the vehicle releasing the depleted container.

The present method in a further form includes inserting a container with charged power cell, associated with the second position of the power strip, into the vehicle by engaging the charge container using a lift mechanism. In one further advantageous form, the lift mechanism is on-board the vehicle.

In use, a compatible vehicle approaches an entrance to the charge-strip, at a predetermined range, the vehicle will automatically come to a stop and normal driving control will be suspended. At this point wireless communication from the charge strip will provide instructions to the vehicle's on-board computer concerning which terminals along the charge strip to stop over and interact with. Once instructions are received, the vehicle's autonomous control system engages and drives the vehicle to a precise position over the instructed empty charge terminal requiring no human interaction. The vehicle then switches to its on-board auxiliary power source, releases chassis locks and uses an on-board mechanism to lower its container with depleted power cell onto the empty terminal. Then, after releasing the container, the vehicle retracts the on-board mechanism in order to once again pass over the strip and row of banks. The vehicle then moves under auxiliary power, and is guided by wireless and optical cues from the charge strip via autonomy to the most-charged container designated by the provided instructions. It then uses auxiliary power to lower the on-board mechanism once again and lock into the replacement container with charged power cell lying on the charge-strip. Then the on-board mechanism lifts the container into the vehicle's chassis and locks secure it in place. The vehicle then switches back to main power and proceeds under autonomous control to the exit of the charge strip. As the vehicle passes over the very end of the strip it comes to a stop automatically, suspends autonomous control, and reinstates normal control. The vehicle is then able to proceed from the charge trip under normal control with a charged power cell in the container of the vehicle, while leaving the container with depleted power cell on the strip for charging.

BRIEF DESCRIPTION OF THE DRAWINGS

Preferred embodiments of the present invention will now be described, by way of example, with reference to the accompanying drawings, in which:

FIG. 1 is a side elevation view of an Autonomous Linear Exchange (ALE) charge-strip with two containers lying on the strip in accordance with the present invention.

FIG. 2 is a top plan view of the Autonomous Linear Exchange charge-strip and two containers shown in FIG. 1.

FIG. 3 is a side elevation view of the Autonomous Linear Exchange system of FIG. 1 shown with a vehicle in position to perform an ALE power exchange in accordance with the present invention.

FIG. 4 is a top plan view of the Autonomous Linear Exchange system and vehicle shown in FIG. 3.

FIG. 5 is a side elevation view of an Autonomous Linear Exchange equipped vehicle in accordance with the present invention.

FIG. 6 is a top plan view of the Autonomous Linear Exchange equipped vehicle of FIG. 5.

FIG. 7 is a side elevation view of an Autonomous Linear Exchange Series 1 equipped vehicle in accordance with the present invention.

FIG. 8 is a side elevation view of an Autonomous Linear Exchange Series 2 equipped vehicle shown in accordance with the present invention.

FIG. 9 is an expanded side elevation view of an isolated Autonomous Linear Exchange Series 2 lift mechanism and an isolated ALE container in accordance with the present invention.

FIG. 10 is an expanded top plan view of the Autonomous Linear Exchange Series 2 lift mechanism and container taken along line 10-10 in FIG. 9.

FIG. 13 is a side elevation view of an Autonomous Linear Exchange container in accordance with the present invention.

FIG. 14 is a top plan view of the Autonomous Linear Exchange container taken along line 14-14 in FIG. 13.

FIG. 15 is a side elevation view of an Autonomous Linear Exchange container with oil cooler revealed in accordance with the present invention.

FIG. 16 is a side elevation view of an Autonomous Linear Exchange oil cooler and an isolated core enlarged from FIG. 15 in accordance with the present invention.

FIG. 17 is a top plan view of the Autonomous Linear Exchange oil cooler and isolated core shown in FIG. 16.

FIG. 18 is an expanded side elevation view of an Autonomous Linear Exchange container in accordance with the present invention.

FIG. 19 is a top plan view of the Autonomous Linear Exchange container taken along line 19-19 in FIG. 18.

FIG. 21 is a detailed side elevation break away view of an Autonomous Linear Exchange locking mechanism in accordance with the present invention.

FIG. 22 is a side elevation break away view of the front end of an Autonomous Linear Exchange equipped vehicle displaying the locking mechanism shown in FIG. 21 in the open position.

FIG. 23 is a side elevation break away view of the front end of an Autonomous Linear Exchange equipped vehicle displaying the locking mechanism shown in FIG. 21 in the closed position.

FIG. 24 is a side elevation view of an Autonomous Linear Exchange tray-style equipped vehicle stopped over an ALE charge-strip in accordance with the present invention.

FIG. 25 is a side elevation view of the Autonomous Linear Exchange tray-style equipped vehicle shown in FIG. 12 performing a power source exchange with an ALE charge-strip.

DESCRIPTION OF THE STATIONARY EQUIPMENT

Figure 11:
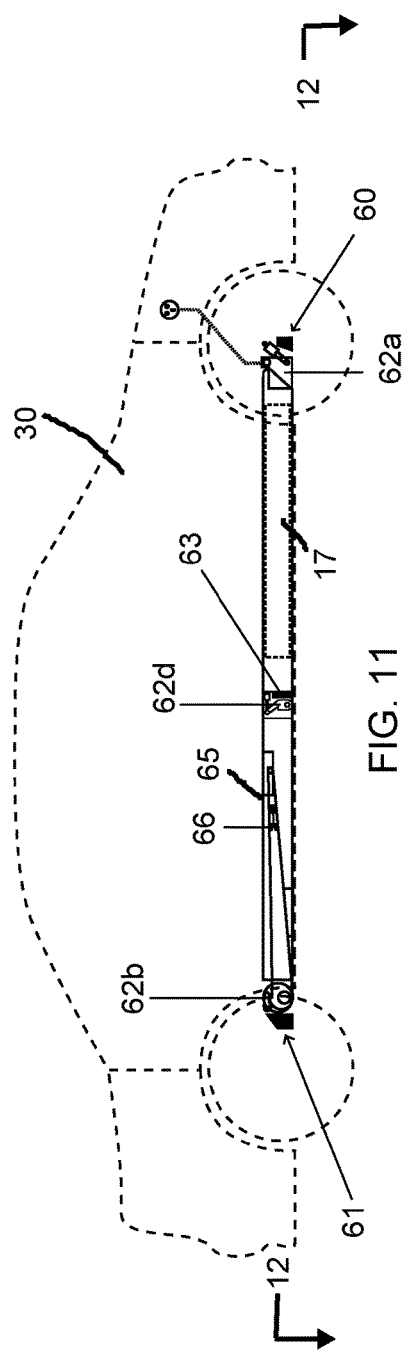
FIG. 11 is a detailed side elevation view of an Autonomous Linear Exchange Series 2 equipped vehicle in accordance with the present invention.

The following detailed description provides for a better understanding of the present method and system.

Referring now to the figures and in particular FIGS. 1-4, in one exemplary form, autonomous linear exchange (ALE) of the present technology such as the system 10 may be used to exchange a container 17 (e.g. containers 17b and 17c of FIGS. 2-4) having a fully charged power cell, with a depleted container (i.e. container 17a of vehicle 30 in which the power cell is depleted, FIGS. 3 and 4) of a suitably configured vehicle such as electric vehicle 30. Compatible vehicles such as vehicle 30 will possess distinctive attributes (e.g., see discussion to follow) that enable ALE and thus the use of the stationary equipment hereafter referred to as the charge-strip 12. The charge-strip 12 has a low profile, flat power cord 13 linking and energizing a series of low profile charging terminals 14 arranged in-line, and having a low profile module 15 containing a computer, communication devices, power grid connections and supplemental terminals used by the aforementioned systems. The charge-strip 12 is modular, allowing its length and, thereby its capacity for placement of containers 17 (both with charged power cell and depleted power cell), to easily be increased or decreased by adding or subtracting supplementary terminals to or from the base terminal.

The base terminal 18 is distinguished from the supplementary terminals by the computer/communication/power connection module 15 at the very beginning of the charge-strip 12. Each modular terminal has the necessary length of "strip" containing the electrical cordage attached to it, and then it can be connected to the next terminal by simply plugging the loose end of the strip section into the last terminal on the strip. The base terminal or section does not have this ability because the loose end of the strip opposite the terminal 18 is occupied by the communication and power connection module 15. The base terminal includes the communication module 15, the necessary length of strip, and the first charge terminal of the strip 18. The supplementary terminals include only the necessary length of strip and a charge terminal 14. The initial base terminal section is connected via the module to a grid power source to energize the entire train of terminals that are added to it.

One significance of the present configuration is that a container 17 with its power cell can be placed directly over the flat power cord 13 and in contact with the appropriate charge terminal 14, and then be driven completely over, straddled by the vehicle 30's left side and right side tires. In many cases, ramps or recessed pavement will be necessary to provide adequate clearance along section 16. Since the ALE system 10 is linear, with terminals spaced to create a line of containers 17 (containers 17b and 17c in FIGS. 2-4) end to end, vehicles 30 are able to drive over the charge-strip 12 and the row of containers 17 (e.g. containers 17b, 17c) which eliminates the need for expensive stationary robotic automation for exchanging and organizing the containers 17. This will be more apparent in the discussion to follow with reference to FIG. 26.

A core understanding is that the ALE equipped vehicle 30 itself replaces expensive and complicated stationary equipment which some prior known technologies may deploy. The vehicle 30 is then able to deposit its container 17 (e.g. container 17a) with depleted power cell on an empty terminal of charge-strip 12 for charging or fueling the depleted power cell. Vehicle 30 can then move forward using auxiliary power cells, 31a,31b, while straddling the line of containers 17 with charged power cell, disposed on charge-strip 12. Finally, the vehicle 30 retrieves a container 17 (e.g. container 17b) with charged power cell. The charge-strip 12 also contains a short range wireless communication system, guidance markings, and a CPU 15 which it uses to gather information from the containers 17, guide the vehicle 30 under autonomous control and execute the container 17 exchange.

On-Board Mechanism, Autonomous Components and Apex

In order to be compatible with ALE, as discussed above, a vehicle such as vehicle 30 must be able to move and perform robotic functions using an on-board auxiliary power source that is electrically connected to the drive system when the main power source is disconnected from the drive system and removed from the vehicle. This ability is to be hereafter known as Auxiliary Powered Exchange or APEx.

This auxiliary power source 31a, 31b need not be large or bulky because the energy required to move along the strip once the main power source (i.e. the vehicle's container 17) is disconnected is minimal. Larger containers requiring significant energy to lift will use the energy in the container itself by making electrical contact at the pick point upon engagement with the boom of the on-board mechanism. The standard method of charging the auxiliary power source, which does not leave the vehicle, is through the energy created via regenerative braking. Using this method wastes no energy from the main power source and instead charges the auxiliary power source each time the brakes of the vehicle are applied during normal use.

The vehicle 30 must also be equipped with compatible autonomous control equipment and a computer (with processor) which is able to receive and process information from the charge-strip via wireless and optical cues. From these instructions, ALE logic stored within the vehicle's computer with computer processor will respond by activating the autonomous control equipment and the vehicle's motor controller to move the vehicle forward or backward along the charge-strip, stopping over the appropriate charge terminals per the instructions from the charge-strip's logic, and steering to keep the vehicle centered perfectly over the linear charge-strip. In addition to these communicative and autonomous features, the vehicle 30 must be further equipped with a locking system and lift which is able to lock and unlock the main battery bank from the vehicle chassis and lower and raise the battery bank to and from the instructed positions along the charge-strip.

Referring now to FIGS. 5-8, though it is not intended to be perceived in any way as a limitation to this technology, it has been determined that a flat, rectangular battery bank or fuel cell container situated within the wheelbase of the vehicle at the lowest point possible is best practice for ALE designs (see, e.g., FIGS. 5 and 6). Such a configuration allows for a minimally invasive container 17 and lift 32 that is best positioned to perform an ALE exchange. In accordance with one embodiment referred to as "Series 2", a container 17 and lift 32 are shown in FIGS. 4, 5, 6 and 8. A "Series 1" is shown in FIG. 7 for comparison.

The unit displayed in FIGS. 5, 6 and 8 is the Series 2, and has many similar features to Series 1 (FIG. 7). A distinction between the embodiments of Series 1 and 2 is that vehicle 40 of the Series 1 lift is geometrically refined for ram (electric, air, hydraulic or other) actuation (FIG. 7), while vehicle 30 of the Series 2 employs an embedded electric motor or motors and planetary gear reductions for actuation (FIG. 8).

One benefit or advantage of the Series 2 over Series 1 is a reduction in invasion from the lift and container into automotive design. As a result, Series 2 is preferable in terms of being less invasive. Adoption of the ALE on-board units by automakers will require a remediation so it is preferable to have the unit with a low profile, light, and true to its basic form, i.e. the flat rectangle. The Series 1 (FIG. 7), though functionally impressive, requires the inclusion of a ram 41, boom base 42 and pivot points 43 and 44 that extend above and below the basic form, respectively. Series 2 eliminates these engineering requirements.

Description of the Series 2 Lift Mechanism

The Series 2 (FIG. 9 and FIG. 10), like Series 1, utilizes base plates 50 and torque tubes 51 at either the front or rear of the container 17, an actuated boom 52 extending perpendicularly from the center of the torque tubes 51 to a near-center point of the battery bank, and a "T-head" 53 at its distal end, designed to enter a slot on the top 54 of the container 17 and engage the pick point 55 of the container 17. A difference in the Series 2 (vehicle 30) from the Series 1 (vehicle 40) is that the Series 2 does not have a ram but rather is actuated by a motor or motors 56 and planetary gear reduction sets 57 imbedded within the torque tubes 51.

The final gear reduction is a ring and pinion off-set reduction 58, which allows the pivot point and drive coupling to be lower than the in-line pinions of the motor and planetary drivetrain 59. It has been determined that this lower pivot for the boom base is superior for proper container release from the chassis. This design, as a whole, effectively eliminates the unwanted space invasions above and below the lift and the container, and provides a flush design keeping to the core engineering goal of a basic flat rectangle. Both the Series 1 and 2 share all other following design aspects.

Figure 12:
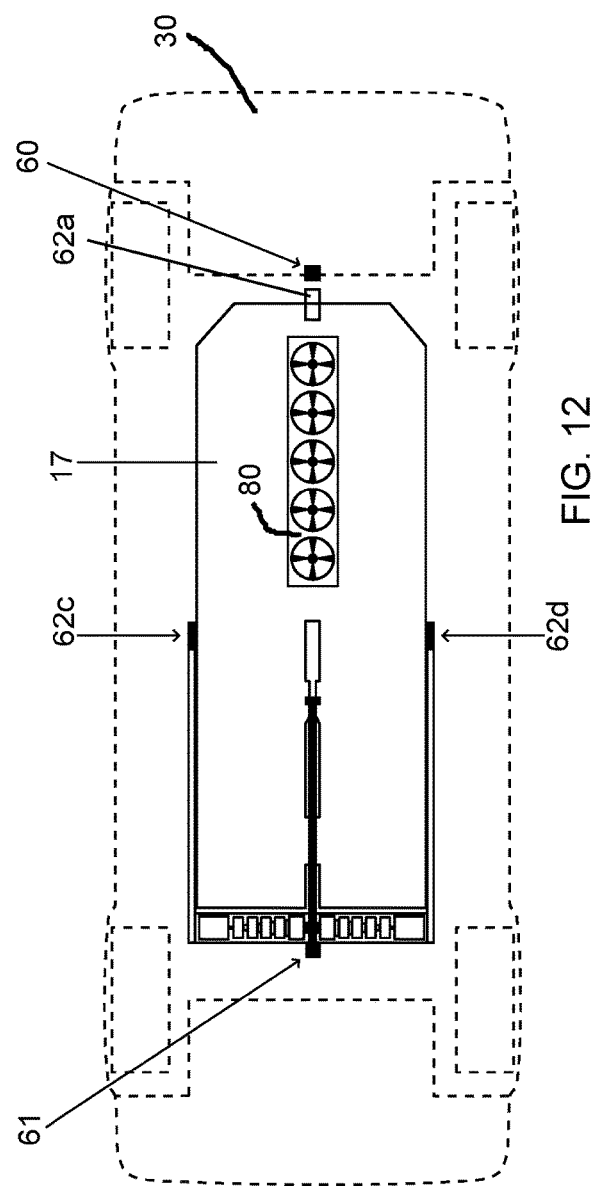
FIG. 12 is a detailed top plan view of the Autonomous Linear Exchange Series 2 equipped vehicle taken along line 12-12 in FIG. 11.

Referring now to FIGS. 11 and 12, beyond the need for a non-invasive flat rectangular lift and container, it is also important to keep as many satellite components which are necessary for the function of the unit and process within the flat rectangle. These components, which are not intended to be considered as a limitation to the scope of this system, include two cameras 60,61, four locks 62a,62b,62c,62d, two range finders 63,64, and a load cell 65. Cameras 60,61 are placed at the front and rear, respectively, of the container 17 and are centered along the vehicle 30 and the on-board lift mechanism. They are mounted facing down in order to read the color and shape information displayed along the charge-strip 12 (FIG. 1).

The cameras 60, 61 are protected by shutters that open upon engagement with the charge-strip 12, and close upon disengagement. The four locks 62a,62b,62c,62d are placed at the front 62a and rear 62b of the unit and the left 62c and right 62d sides of the unit. These locks release once the vehicle 30 is positioned over an empty terminal (charge-strip 12), and engage when a container 17 with charged power cell is lifted and seated within the chassis. The load cell 65 is incorporated into the boom head of the lift 66, and is used to send pressure sensing feedback to the on-board control system. This enables the system 10 to sense the container 17 when it is connected to the boom by the pick point, as well as sense touchdown when lowering the container 17 or the boom to the charge-strip 12. The two range finders 63 are positioned on the left and right sides of the unit and are used to provide leveling feedback to the on-board control system. It is necessary to use controllable shocks or additional suspension leveling equipment in order to prepare the vehicle 30 for an exchange upon wireless engagement with the charge-strip 12. Other necessary equipment which are not described in detail here include automatic steering and braking hardware and an on-board computer or CAN buss in which ALE logic is stored and executed from. Advantageously, the vehicle's motor controller (electric vehicles) or throttle and gear shifting control (fuel vehicles) is/are electronically accessible to the ALE unit's logic in order to provide the forward and reverse motion of the vehicle along the charge-strip.

Description of the Ale Modular Power Source Container (Battery Pack, Bank or Fuel Cell)

Referring now to FIGS. 13 and 14, the ALE container 17 consists of several key sub-components that distinguish it from non-ALE containers, and is designed to be as low profile, light, and as close to a basic flat rectangle as possible. Most applications will require the corners of the flat rectangular shape to be chamfered 70 in order to allow adequate clearance for steering wheels. The architecture is designed around a structural "spine" 71, consisting of a channel which provides longitudinal rigidity during the lifting and lowering process, as well as provides the slot 72 and mounting points for the pick point 73 and saddle 74. The spine 71 also provides a passage and protection for the electrical buss 75 that runs the length of the pack and energizes three separate terminals located at the forward lock, the pick-point, and the rear lock area at the base of the boom. This allows automakers to tap into the front, center or rear of the container for drive power as well as additional charging options. The electrical buss also contains the data collection and storage module 76 which collects data from sensors throughout the container and then provides the data to the ALE Data System as will be discussed more in the disclosure to follow.

Figure 16A:
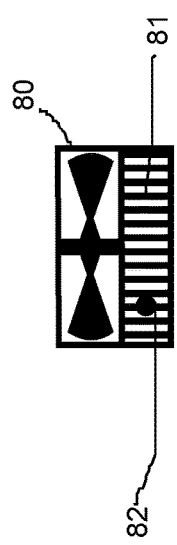
FIG. 16*a* is an enlargement of a single oil cooler and an isolated core enlarged from FIG. 15.
Figure 17A:
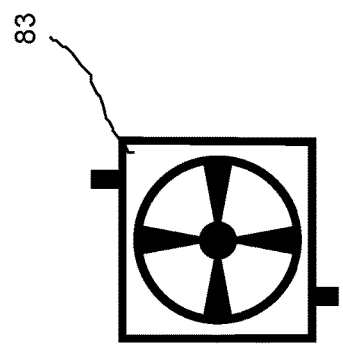
FIG. 17*a* is an enlargement of a single oil cooler and isolated core shown in FIG. 17.

Referring now to FIGS. 15, 16 and 17, the spine 71 also houses an oil cooler 80 for the container 17. The oil cooler area is usually centered and located opposite of the slot, saddle and pick area of the container 17, but can be located anywhere within the container 17. The cooler 80, like the container 17 itself, is modular consisting of a number of cores 80a. Each core 80 consists of a small mineral oil-resistant radiator 81 and micro-pump 82 (82a-82f), mounted to a size-matched electric fan 83 (FIG. 17). FIGS. 16a and 17b show a discrete core 80 to more clearly emphasis that the core 80 is in fact composed of cores 80a-80f, and thus a series of separate cores forming a modular system of cores.

In one form of the present system, five 90 mm fans and radiators are used in a 60 kwh pack, but that is not to be perceived as a limitation to the scope of the container-mounted cooler concept claimed herein. Cooler size is matched to average usage of the style of container. For instance a style-A container might have a standard six-core cooler, and a style-A-HP (high performance) might have a 12-core cooler to support a higher powered drive system. The cooler's radiator cores are plumbed into inlet and outlet ports, usually located within the spine-channel which lead into the container's interior, and mineral oil or similar non-conductive coolant is able to flow either using an open-circulatory system, or a closed-circulatory system via the small inline pump.

Referring now to FIGS. 18 and 19, cross-members 91 extend to either side of the spine 71 to create a "cross" style internal framework, where the terminus of each point of the cross becomes the structural backing and mount for the container-side locking points. The locking points are located on the left and right sides of the container, for engagement with the chassis-locks 92, and at the opposite end of the lift mechanism for the forward or nose-lock 93. The cross created by the spine 71 and main central cross-member 91 creates four quadrant zones 94a-94d for fuel-cell or battery packing. The container 17 framework also includes a perimeter channel, with ears facing inboard 95, which acts as secondary structure to the main cross frame, and also provides protection for the packs contents from a side impact. The container 17 is skinned on top with a lightweight water and oil resistant material, a lid 96, and an oil-tight seal is created by first applying a sealant to the ears of the perimeter channel 95, central cross-member 91, and spine 71, and then riveting or screwing the upper skin or lid at close spacing such as 5 cm along all contact points. The lid 96 also bares color and shape markings along the upper surface and centered along the center-line of the container 17 similar to that of the charge-strip 12, so that vehicles passing over the container while it is lying on the charge-strip are able to maintain alignment via visual cues. The bottom surface or pan 97 is made of a more durable material such as stainless steel or carbon fiber in order to resist puncture or damage from hazards on the road. It also is to be sealed and riveted or otherwise fastened at close interval, such as 5 cm, in order to create an oil and water tight seal. These are the details of the first prototype ALE battery bank container 17 and are not to be understood as a limitation to the scope of this design.

Description of the "Off-Center Pick"

Before the development of the Series 1 it was noted that battery bank stabilization during the lowering and lifting process was a challenge. The container 17, being a large flat and heavy object should never be able to swing, wobble, pitch, or twist while between the charge-strip and the vehicle chassis. Many other designs where conceptualized in order to come up with a solution to this specific issue. The difficulty in each of those designs was that they required added complication which can also be understood as added cost, shorter life, and less durability.

Figure 20:
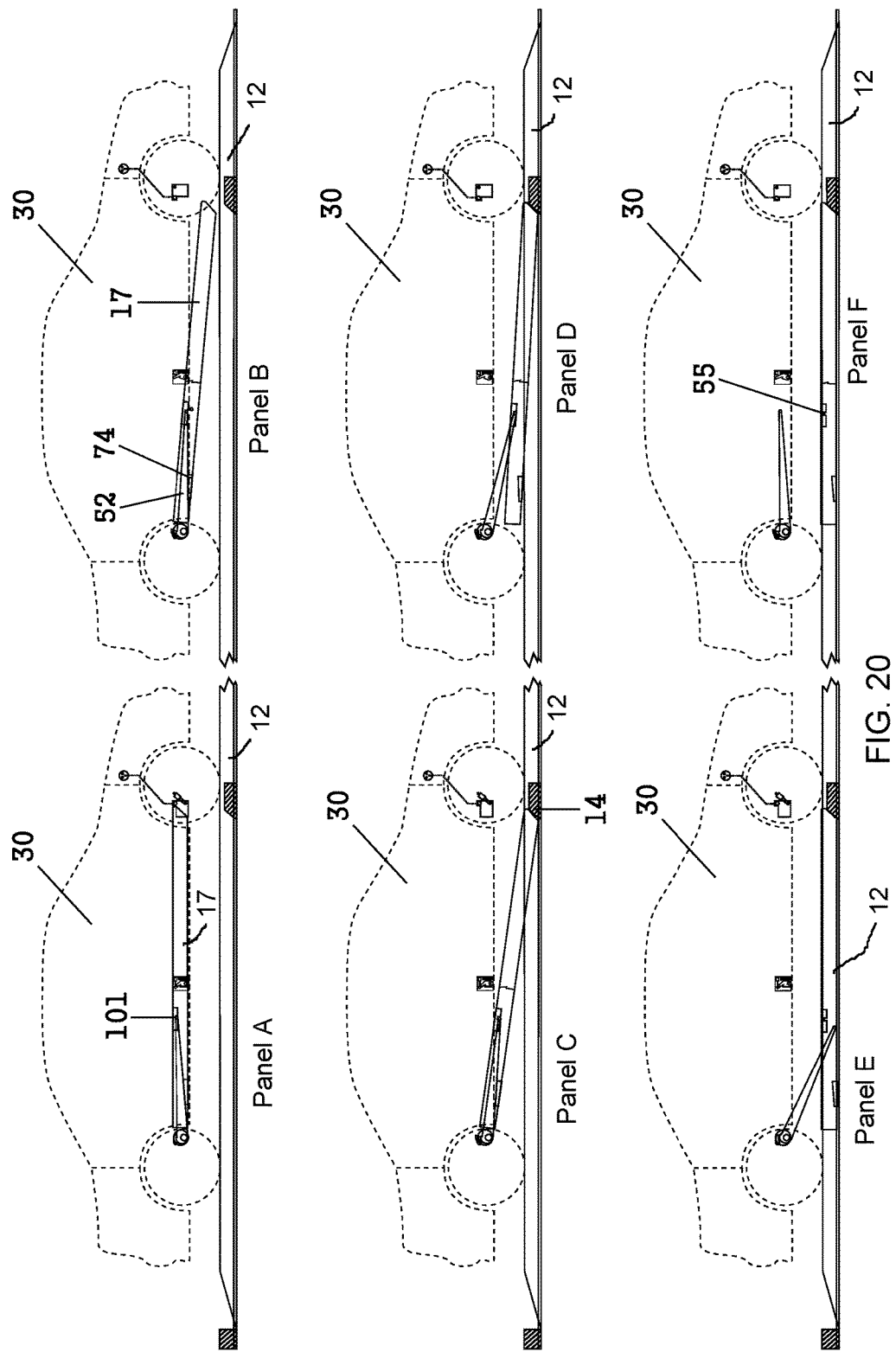
FIG. 20 comprises panels A-F showing steps in power exchange of an Autonomous Linear Exchange vehicle of the present ALE system, as a series of side elevation views during the exchange process, in accordance with the present invention.

Referring now to FIG. 20 which comprises panels A-F, an Off-Center Pick configuration allows one to implement the embodiment of Series 2, or that of Series 1, or other such simplified, free-pivoting pick point 55 connection to the container 17 thus eliminating the need for the geometrically stabilized boom heads discussed above. The prior described, very simple method of lifting and lowering the container 17 only requires that the pick point on the container 17 be slightly off-center of gravity as identified in location 101 along the longitudinal axis. The result is a two stage lifting and lowering process where the bank or cell is always in contact with the vehicles chassis or the charge-strip 12 or both. This provides a minimum three points of contact at all times, two points being the left and right corners of the end of the container 17 and the third being the pick point itself 55.

Panels A-F of FIG. 20 are a series of step-by-step views along the process of power exchange of vehicle 30 in the Off-Center Pick process. In panel A, at a first step, vehicle 30 has container 17 and the lift in riding position with locks closed. In panel B, at a designated empty terminal on the charge-strip 12, the vehicle 30 will stop in precise position, locks will release, and the on-board lift mechanism will bare 100% of the container's weight. Since the pick point on the container 17 is off-center toward the lift side, and also able to teeter at the pick point 55, and since stoppage of the teetering effect is achieved by the saddle rest 74 which comes in contact with the boom 52 of the lift near its base, the container 17 is now rigid with the boom, and all of the force is handled by the torque tubes and dispersed to the vehicle through the base plates.

Referring now to panel C, once the boom is activated toward the charge-strip 12 in order to deposit the container 17, the lift side of the container moves very little, while the opposite free end; distal of the boom pivot point, lowers until it makes contact with the charge-strip terminal 14. Next, as shown in panel D, once the container 17 has made contact with the terminal, the heavier distal end is supported and the proximal end of the container rotates away from the boom as it continues to lower toward the charge-strip 12.

Referring now to panel E, once the proximal end comes to rest as well as the distal end, the weight of the container is now fully supported by the charge strip and the T-head of the boom comes free of the pick point as the boom continues to lower.

Finally, as shown in panel F, once the boom senses touchdown, the vehicle 30 is commanded to move slightly forward or backward for the T-head to clear the pick points on either side of the slot, and then the boom raises to the riding position, leaving the container on the charge-strip 12. The vehicle 30 then moves under auxiliary power in position over a charged or fueled container and reverses the process described above to retrieve it, lock it in place, and then exit the charge-strip.

Both ends of the container 17 as well as the pick point contain contact points and both ends are electrically connected to the charging terminals when lying in position on the charge-strip. The contacts at the pick point are utilized when a small auxiliary source is available yet the main bank (container) is very heavy. In this case the boom head will make electrical contact with the container's electrical buss, and be able to draw power from the very container it is lifting instead of relying on the auxiliary source. This design is completely stable and reliable, and has already been constructed and successfully tested within a demonstration and research chassis.

Description of Nose-Lock and Plug-In-Charging Option

Referring now to FIGS. 21-24, a main lock, referred to a nose-lock 62a, for container 17 is opposite of the lift mechanism 32. Nose-lock 62a performs a few important functions. Nose-lock 62a provides strong jaw-style locking motion which not only locks the container 17 but scoops and presses it in place 114, making sure of a firm seating into the chassis. The nose lock 62a also contains an air-port 115 which provides the ducting of cooling air into the cooler core area, while keeping moisture and road-grit separated from the electrical connections within the lock, and most importantly, a duplicate charge-terminal plug similar to the ones found on the charge-strip 12. This charge-terminal plug is shoved over the terminal tabs 117 on the container 17 as the nose-lock 62a is seated which protects the tabs 117 from corrosion, provides electrical contact for drive-power to the vehicle's drive system, and also is connected to a standardized recharging plug 118 on the vehicle 30. This allows the user to also plug an ALE equipped vehicle into stage 1, 2 or 3 chargers as an additional option. In fact it is not necessary to ever exchange a battery container if it is not desired, because the nose lock system allows for plug-in use of the vehicle indefinitely. This built in option allows yet even more flexibility to automakers who choose to incorporate ALE.

Other Claimed Lift Configurations

Though the Series 1 and Series 2 have been described and are considered the current preferable choices for manufacture and distribution, it is very easy to see that many other lift configurations and modification are possible in accordance with this disclosure. This includes the following noteworthy designs. First, a scissor lift driven by a motorized acme screw running longitudinally along the vehicle chassis and battery bank or fuel cell. This lift has a head that locks into the center of the pack, and then is pulled into place within the chassis using the acme driven scissor lift. Second, a parallelogram boom, configured quite like an articulating desk lamp having twin-spar construction with pivots at the intersection of each spar and the base and head, which keeps the head of the boom parallel to the chassis at all times. The head of this unit, much like the acme scissor lift, is controlled from pitching, swinging or twisting by the geometry of the design. Third, a tray system (see, FIGS. 24 and 25) where a tray 121 spanning the entire strip-facing side of the container 17 is unlocked at the exchange side of the container 17, and pivots 123 at the opposite side of the container 17, lowered by rams 124 at any point between the front and rear points of the tray.

This design is highly protective of the container 17 and may be necessary for off-road or rigorous duty vehicles. Fourth, a magnetic locking system to the existing lift has been contemplated and is claimed herein. In this case the boom will lower, and then lock into the battery utilizing an electro magnet located either on the boom head itself or the battery bank or fuel cell pick point. Magnets may still be used in all designs for the purpose of centering and aligning, and temporary manipulation of all sorts.

Description of Charging or Refueling Plaza

Figure 26:
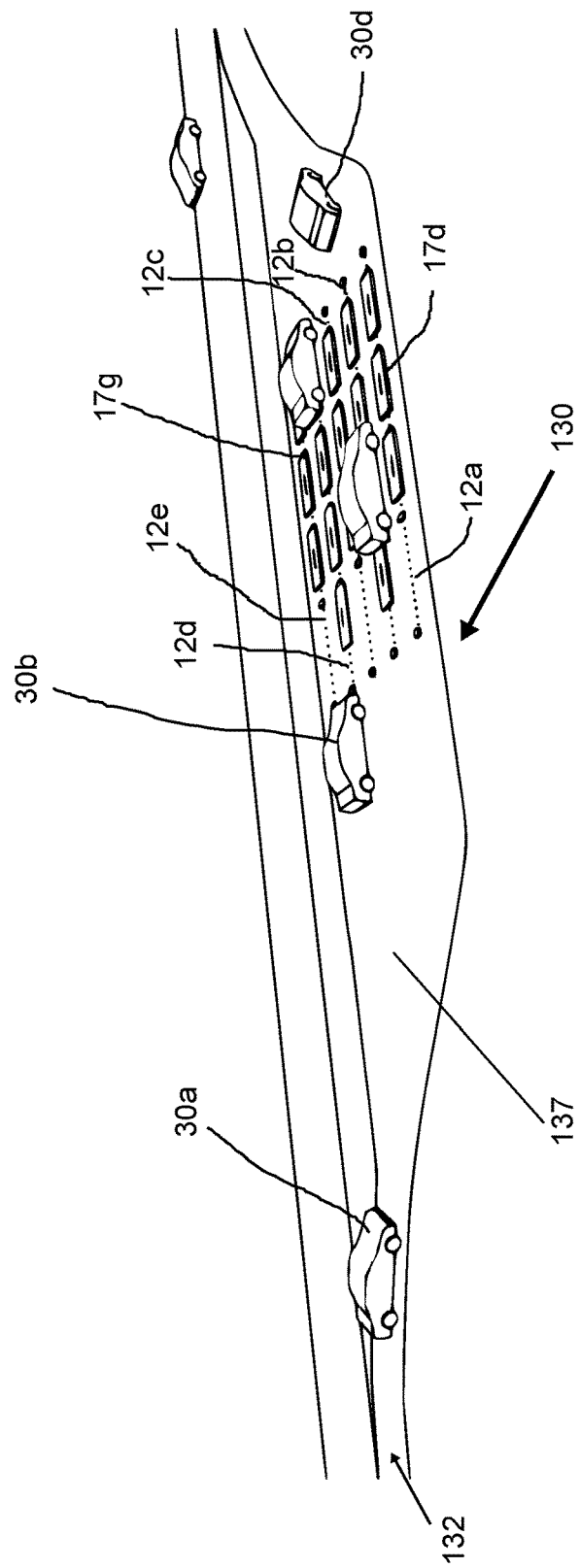
FIG. 26 is a perspective view of an Autonomous Linear Exchange plaza servicing multiple ALE equipped vehicles along the side of a roadway in accordance with the present invention.

Referring now to FIG. 26, in one advantageous form, a refueling plaza 130 can be constructed of simplest form with a plurality of charge-strips (e.g. 12a-122) positioned in parallel (geometric) on a flat surface such as a concrete parking lot or a highway safety rest area. Autonomous routing can then be created to feed vehicles (e.g., 30a-30d) with depleted power sources in one side of the plaza 132, lead them to the appropriate charge-strip (e.g., 126) containing the appropriate container with power cell, and then lead them out the opposite side 133 of the charge-strip 126 once the exchange has been executed and out exit 135. This process is also compatible with manually operated vehicles, in which case can be driven by the operator to the appropriate strip containing the correct container with power cell for the vehicle, and then engaged by the system at the engagement area 137. The charge-strips (12a-12d) can be organized to suit the area's vehicle power needs. Different sizes of containers 17 (e.g. containers 17d and 17g) with different power cell can be serviced by size specific charge-strips, but no one charge-strip may service a variety of sizes.

It is important for the function of this system that each strip contains a plurality of only one specific kind of power source. Avoidance of a vehicle/power source mismatch will be handled by the wireless communication at first engagement. Using the present system, the amount of vehicles able to be serviced per minute can be determined by dividing the recharging or refueling time of the specific type of power source by the number of them in the plaza. For example if an electric vehicle has a container with power cell that requires an hour to fully charge, and there are ten banks on the strip, then 1 hr/10 banks=one vehicle serviced every six minutes. In a an area requiring a high frequency of exchanges, multiple parallel strips or long strips can increase the rate of power source readiness dramatically.

Description of Ale Container Data Collection System

All ALE containers will incorporate multiple sensing technologies to record and report temperature, output, charging indicators, and a host of other meta-data related inputs. The units will also all be equipped with a processing chip, clock and memory card in order to store data from these sensors along a timeline. This will provide a detailed history on the use of the pack, its current status and charge, as well as any problems it may have. This data is then pulsed from the vehicle via the connected-car-network if the vehicle is so equipped, or in the case of non-connected cars the data is uploaded to the collection system's servers once the container is connected to a terminal along the charge-strip. The data is then stored, analyzed and projected to the system interface or API. Access will be made available to all users and auto manufacturers to pull real-time data on the network of containers around the globe. This data can then be used by applications within a smart-phone, PC, or the vehicles infotainment system to determine which container should be engaged. Even more elaborate use of this data by transit companies employing large numbers of vehicles will allow the "hand-off" of containers from one vehicle whose occupants are not traveling far to a vehicle whose occupants are traveling farther for the more streamlined consumption of power over distance traveled. Using such a network with real-time data provided by the ALE data collection system would also allow emergency services using ALE equipped vehicles to gain priority access to charged banks.

Although an electric vehicle with requisite power source is described, other powered vehicles including ones using fuel cells can be adapted to use this technology.

The ALE system is completely novel and unlike any other technology in the automotive industry, let alone EV technology. EV sales are limited by negative market perceptions of range and convenience, while the industry dreams up systems that cannot yet be supported. Existing technologies such as proprietary rapid exchange systems for certain EVs and the now closed firm, Better Place failed to invent along the lines of economics. Further, there is no business plan that will support a near half-million dollar investment in a subterranean robot in order to service three EVs per day. ALE technology in concert with compatible autonomous, auxiliary powered exchange vehicles solves this impasse by providing a transitional solution that is non-invasive to construct, and financially approachable for virtually any property owner or manager.

Further, the present method and system have unique advantages over prior known technologies realized by using the vehicle itself as the main mechanization of the process, which thereby lowers cost significantly. The present ALE method and system can be implemented by common business owners with a wide variety of configurations because it can be adapted to virtually any property. It will allow for the incremental growth of the EV industry because it will beat the range and convenience argument from the market, and it will be an easy lucrative investment for anyone interested in offering rapid exchange on their property. Initially, low-investment, simple and numerous rapid exchange locations will be necessary. These coupled with information technology that can quickly and seamlessly coordinate the mass consumption of rapid exchanges via the connected car network is the next step for electric vehicles.

One of ordinary skill in the art will recognize that additional embodiments are also possible without departing from the teachings of the presently-disclosed subject matter. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and can be made without departing from the spirit and scope of the presently-disclosed subject matter.

I claim:

1. A system for vehicle power exchange, the system comprising:
   at least one power exchange strip;
   at least one charged power cell associated with the at least one power exchange strip, the at least one power exchange strip having a first station for receiving a depleted power cell from a vehicle requesting power exchange and a second station physically separated from the first station and having a charged replacement power cell for installation in the vehicle after the depleted power cell have been removed;
   a communication device operatively associated with the at least one power exchange strip for communicating between the at least one power exchange strip and a vehicle requesting power exchange; and
   the vehicle having auxiliary power in addition to power supplied by the depleted power cell to power the movement of the vehicle from the first station to the physically separated second station, after the depleted power cell has been completely removed from the vehicle and left at the first station, wherein the vehicle without depleted power cell moves under auxiliary power to the second station.

2. The system of claim 1, wherein the charged power cell is a chemical battery pack.

3. The system of claim 1, wherein the charged power cell is a fuel cell pack.

4. The system of claim 1, wherein the power cell is disposed in a container disposed along the power exchange strip.

5. The system of claim 4, wherein the container further comprises a cooler.

6. A method for vehicle power exchange, the method comprising:
   receiving a vehicle for power exchange at a first stationary position along a power exchange strip;
   establishing a communicating connection between the vehicle and the power exchange strip to control vehicle functions during power exchange;
   communicating instruction to a computer processor of the vehicle via the communication connection to release a depleted power cell from the vehicle, at the first stationary position along a power exchange strip;
   removing the depleted power cell completely from the vehicle and leaving the depleted power cell at the first station;
   moving the vehicle, after the depleted power cell has been completely removed from the vehicle, to a second position along the power exchange strip; and
   inserting a charged power cell, associated with the second position of the power strip, into the vehicle;
   wherein moving the vehicle to move to a second position along the power exchange strip comprises instructing the vehicle, via the communication connection, to move to a second position along the power exchange strip, using auxiliary power on-board the vehicle, supplemental to the removed power cell after the depleted power cell has been completely removed from the vehicle.

7. The method of claim 6, wherein communicating instruction to a computer processor of the vehicle via the communication connection to release a depleted power cell from the vehicle, at the first position along a power exchange strip results in the vehicle releasing the depleted power cell.

8. The method of claim 6, wherein inserting a charged power cell, associated with the second position of the power strip, into the vehicle comprises engaging the charge power cell using a lift mechanism.

9. The method of claim 8, wherein the lift mechanism is on-board the vehicle.

10. The method of claim 6, wherein the power cell is disposed within a container and the releasing a depleted power cell comprises releasing the container with the depleted power cell.

11. The method of claim 10, wherein the container further comprises a cooler.

12. The system of claim 1, further comprising a wireless communication device operatively associated with the at least one power exchange strip for communicating between the at least one power exchange strip and a vehicle requesting power exchange.

13. The system of claim 12, further comprising a processor associated with the at least one power exchange strip and the wireless communication device for controlling functions on the vehicle requesting power exchange.

14. The system of claim 13, wherein the processor controls movement of vehicle between the first station and the second station.

\* \* \* \* \*